United States Patent [19]
Hervieux, deceased

[11] 3,827,124
[45] Aug. 6, 1974

[54] MACHINE FOR CONVEYING EXPANDING AND APPLYING ENDLESS SEALING MEMBERS

[76] Inventor: Harvey Joseph Hervieux, deceased, late of Algoma Mills, District of Algoma, Ontario, Canada by Bernice Hervieux, administratrix

[22] Filed: May 11, 1973

[21] Appl. No.: 359,338

[52] U.S. Cl. ......... 29/200 A, 29/200 P, 29/211 D, 29/235
[51] Int. Cl...... B23p 19/00, B23q 7/10, B23p 19/02
[58] Field of Search.......... 29/200 A, 200 P, 208 D, 29/211 D, 235, 451

[56] References Cited
UNITED STATES PATENTS
3,319,325   5/1967   Nessamar et al. ................... 29/235

*Primary Examiner*—Thomas H. Eager
*Attorney, Agent, or Firm*—Meyer, Tilberry & Body

[57] ABSTRACT

The invention provides an apparatus for deforming deformable endless sealing members and applying them in stretched condition to a workpiece. The apparatus has a guide member, and the endless sealing members are fitted over one end and passed along it by a push mechanism. Supporting means are adapted to support the guide member while permitting the passage of the endless sealing members along it. The guide member terminates in an expansion mandrel which abuts the workpiece onto which the sealing members are to be placed.

The guide member and its supporting means can also be used without an expansion mandrel as a conveyor for endless members.

11 Claims, 4 Drawing Figures

MACHINE FOR CONVEYING EXPANDING AND APPLYING ENDLESS SEALING MEMBERS

This invention relates to apparatus for expanding endless sealing members, and applying them singly to a workpiece. In addition, the invention has application to conveyor systems for endless members.

Sealing members such as O-rings are used in a variety of applications in the construction of machinery and the like. Such rings are used to form seals between two parts. Generally, they are stretched and slid over one of the parts so that they are seated thereto and remain in slightly stretched condition, fitting snugly about the part. It is thus necessary to expand the O-ring before it is applied to the part, and to then slip it onto the part. Such expansion can of course be done manually, but this is not convenient in a high speed assembly process.

The present apparatus has as its object the supply singly of O-rings to workpieces, and the expansion of each O-ring to a stretched configuration in which it can be slid onto the workpiece where it is to be seated. Further, the present apparatus permits the rapid supply of such O-rings, and the stretching of them to a predetermined configuration during the process of such supply.

The invention also has as object to provide a conveyor for endless members, of which O-rings are an example, and comprises a member along which the endless members can be made to travel, and means for supporting this member.

The invention will be further described with reference to the drawings in which;

In FIG. 3, the embodiment is shown with the slide member 14 (to be described) in the rearmost operating position, and in FIG. 4, it is shown with the slide member in th most forward operating position.

Figure 1:
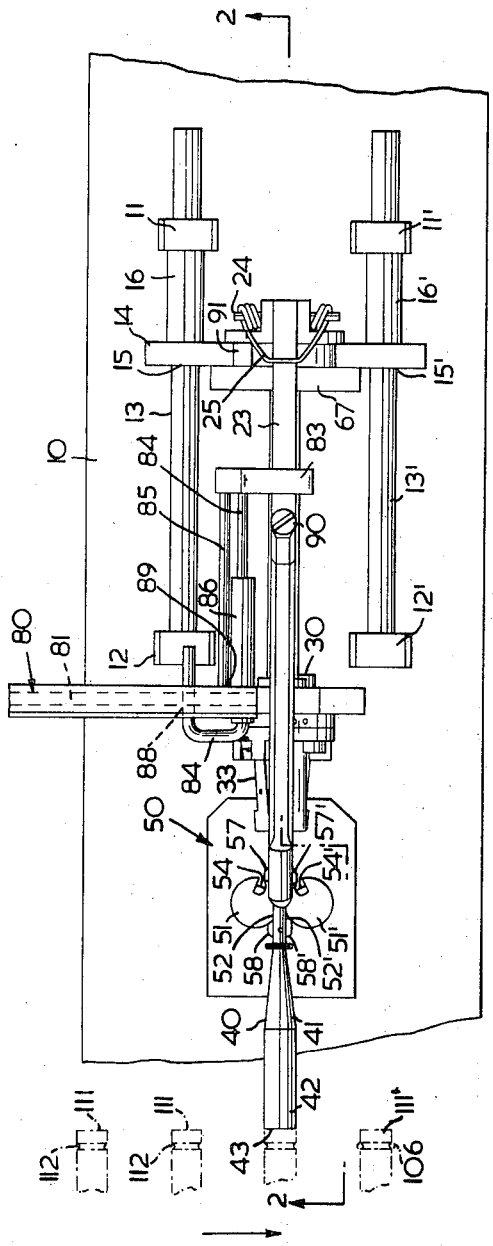
FIG. 1 is a top plan view of one embodiment of the invention.
Figure 2:
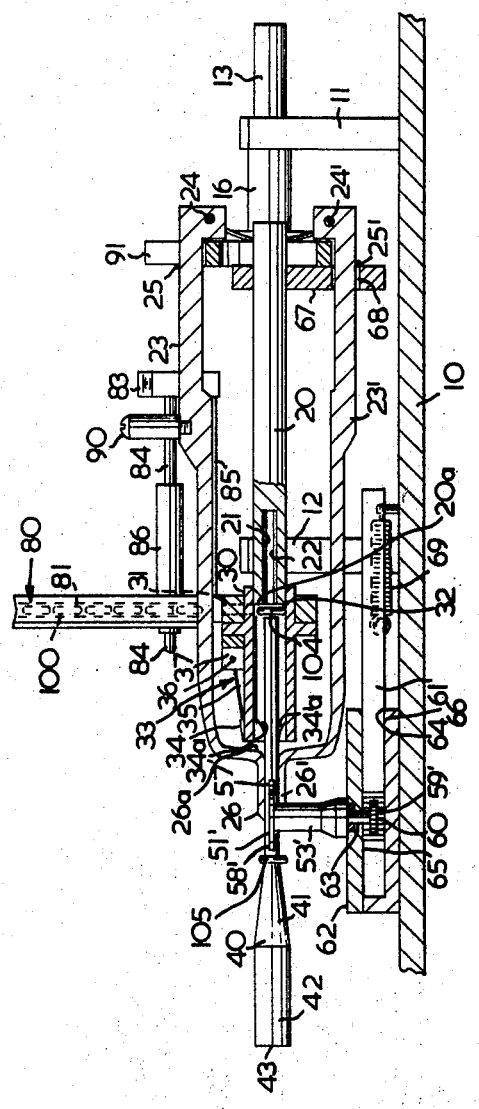
FIG. 2 is a cut away side view of the same embodiment, taken along lines 2—2 of FIG. 1.

Referring to FIGS. 1 and 2, a body member 10 has mounted upon it two rear legs 11 and 11', and two front legs 12 and 12'. The legs 11 and 12 are joined by a rod 13, and the legs 11' and 12' are joined by a rod 13'. A slide member 14 is provided with holes 15 and 15', through which rods 13 and 13' pass permitting slide member 14 to slide reciprocally along the rods 13 and 13'. Suitably, the member 14 is supplied with tubular extentions 16 and 16', which fit over portions of the rods 13 and 13' rearwardly of the member 14. The extensions serve to limit the travel of the member 14 in a rearward direction along rods 13 and 13' as the motion is stopped when the members 16 and 16' abut against the rear legs 11 and 11'. Forward motion of member 14 is permitted until the member 14 abuts against the members 12 and 12', which act as stops limiting motion in a forward direction.

Member 14 can be connected to a suitable power source for reciprocal motion along the members 13 and 13' between the stops as aforesaid, or it can be reciprocated manually between these stops.

Attached to member 14 and aligned with its axis parallel to the members 13 and 13' is a central push rod 20. The push rod 20 is hollow at its forward end 21 and has slots open to each side in the hollow portion, as shown at 22. The push rod 20 is fixed rigidly to slide member 14, for reciprocating motion therewith.

Attached to the top and bottom of member 14 are push members 23 and 23'. These push members are pivotally attached to member 14 by pivot pins 24 and 24', respectively. Springs 25 and 25' are wound about the pivot pins and over the top of members 23 and 23' and these springs tend to urge the members 23 and 23' into a rest position as shown in FIG. 2, with the axis of these members generally parallel to the axis of the push rod 20 and the guide rod 15.

Members 23 and 23' are bent so as to approach one another in their forward parts. The two forward parts end in pushing fingers 26 and 26', which are slightly curved to fit over the guide rod 40 (which will be described later) for sliding movement therealong.

The front end of rod 20 is received in a hollow tube 30, which is provided with an opening 31, through which O-rings or other endless sealing members are supplied singly to a chamber 32. In FIG. 2, an O-ring 104 has been supplied through opening 31, and is now resting in chamber 32. O-rings can be supplied singly through hole 31 to chamber 32 by any convenient method, as long as O-rings are supplied at the appropriate stage in the cycle of operation of the machine, as hereinafter described. One method of supplying O-rings to chamber 32 will be described later.

Attached to the outer perimeter of the tube 30 are two jaw members generally indicated as 33 and 33'. Each of these jaw members comprises a jaw 34 which fits partially about guide member 40 (to be described later), an arm 35, and a pivotal attachment 36, which is attached to an extension 37 on the outer perimeter of tube 30. Spring means (not shown) are provided to normally urge the jaws 34 against the guide rod 40, and are associated with pivot 36.

The guide rod 40 will now be described. The posterior end of this rod is enclosed within the tube 30, just in front of the chamber 32. The diameter of the rod 40 at this point is slightly smaller than the diameter of the O-rings or other sealing members with which the apparatus is designed to be used. The rod 40 runs forwardly from this position, and passes out of the tube 30, being engaged by the jaws 34 at or near the place where it passes out of the tube 30. If desired, the tube 30 can be cut away in the area of the jaws 34 so that the jaws 34 can engage the guide rod 40 at places where the guide rod is still substantially surrounded by the tube.

Forwardly of the point of emergence from the tube 30, the guide rod 40 passes between the pushing fingers 26, and 26' previously described. The rod 40 is engaged from the side by the support mechanism 50 (to be described later). Anterior to the support mechanism 50, the diameter of tube 40 becomes larger, in a gradual trnasition as shown at 41. The most forward portion of the tube 40 is of the diameter to which it is desired to expand the O-rings, as indicated at 42.

The support mechanism 50 will now be described. The support mechanism 50 for guide member 40 comprises two discs 51 and 51' with their peripheries coplanar with the axis of guide rod 40. Discs 51 and 51' coact respectively with slots 52 and 52' in member 40. The circumferential edge of the disc enters the slot, thus acting as a support for member 40.

Discs 51 and 51' are supported respectively on pillar mounts 53 and 53', which will be described further later.

In the operation of the device, O-rings or other endless sealing members are passed along the guide rod 40. A mechanism must therefore by provided to pass the O-rings or other sealing members by the support discs 51 and 51'. To accomplish this, each of the support discs is provided with a recess, shown respectively as 54 and 54'. Each disc and its mounting pillar 53 or 53' is rotatable through the arc shown by the arrow 55a or 55'a, in FIG. 3. If desired, small "wings" or pieces of metal 57, 58, 57' and 58' can be inserted into extensions of the slits 52 and 52' on both sides of the discs 51 and 51'.

The mechanism for causing rotation of the disc 51' and its associated column 53' is shown in FIG. 2. It will be understood that similar structure is provided for disc 51 and column 53.

At the bottom of column 53' is a pinion 59'. The pinion 59' is mounted upon the column 53' for rotation therewith, and the column 53' is pivotally mounted for rotation on the base 10, as indicated at 60.

Coacting with the pinion 59' ( ans a similar pinion which is not shown, at the base column 53) is a rack member 61. Conveniently, the pinion and a portion of the rack member are contained within a housing 62, which has opening 63 through which the column member passes and opening 64 through which the rearward part of the rack member passes. Suitable bearings, shown schematically as 65 and 66, are provided for the support of the rack member.

Extending downwardly from the slide member 15 is a push extension 67. The extension 67 has a hole 68 therethrough, so that the member 23' can pass through. The hole 68 is considerably larger than the member 23', so that the member 23' can pivot about the pivot point 24 a sufficient amount to carry out its functions as later described, without being impeded by the extension 67.

The extension 67 is arranged so that it will contact the posterior end of the rack member 61, and push the rack member forwardly, when the slide member 14 is advanced forwardly to the limit of its travel.

The rack member 61 is provided with a spring 69 which attaches it to the base member 10. The purpose of the spring 69 is to return the rack member 61 to its rest position as shown in FIG. 2, after it has been pushed forwardly by the push extension 67, and after the push member 67, along with the slide member 14, has subsequently been withdrawn.

The means for supplying the sealing rings to the chamber 32 will now be described. A magazine unit indicated generally as 80 contains a channel 81 in which sealing rings indicated generally as 100 are arranged in side by side relationship. The channel is slightly larger in its dimensions than the rings with which it is to be used, and is arranged at a slight angle to the vertical, so that rings in it can travel downward along it due to the influence of gravity. Suitably, the front of the channel 81 is made of transparent material as shown at 82, so that the sealing rings in it can be observed.

A pusher member 83 has attached to it two rods 84 and 85, which enter the channel 81 at approximately right angles to the direction of ring travel along it. Suitably, the pusher member 83 and its attached rods are retained in place by a tube 86, which is rigidly attached to the unit 80, and which supplies support for the members 83, 84 and 85. Support is also supplied by the journaling of the rods 85 and 84 in the the magazine unit 80, at 87 and 89, as will be described.

The rod 84 passes through a journal in the unit 80 at a point outside the channel 81, shown as 87. It then forms a U-shape, and enters the channel 81 from the other side, as shown at 88. The rod 85 enters the channel 81 from the rear as in a journal indicated at 89. The rods are arranged so that only one is positioned to prevent passage of rings along the channel 81 at any one time.

The pusher member 83 is acted upon by two push members 90 and 91 associated with the slide 14 or its attached members. Suitably, the push member 90 can be mounted upon the arm 23, and the push member 91 can be mounted on the member 14 itself. It will be understood that the member 83 is not connected to either member 90 or 91, but is adapted to be pushed by them when they contact it during the reciprocating cycle of member 14.

The operation of the device will now be described. In the mode of operation described, it is the purpose of the device to supply O-rings to cylindrical workpieces having grooves for the reception of such rings. Such workpieces are shown in phantom as 110, with the grooves shown as 111.

Figure 3:
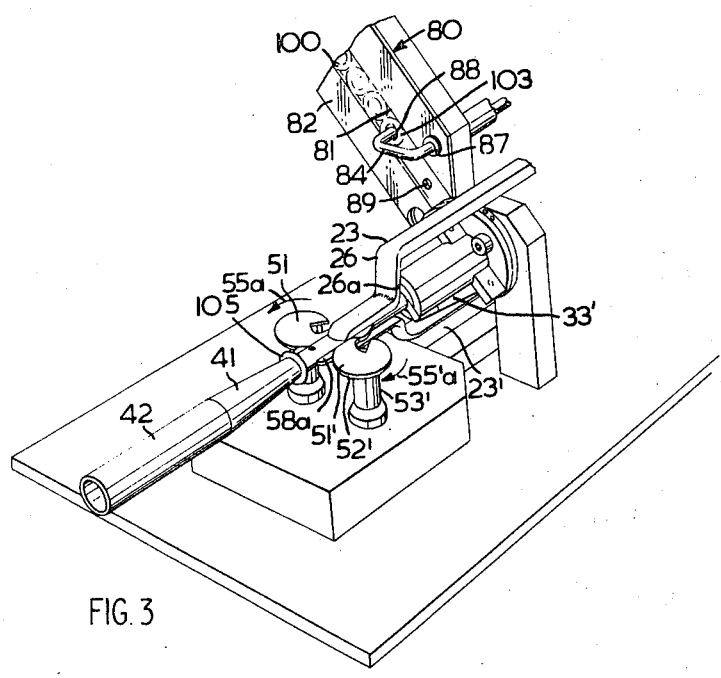
FIGS. 3 and 4 are partial perspective views of the same embodiment of the invention, showing it at different stages in its operating cycle.

To commence operation, the magazine channel 81 is charged with O-rings 100, and the slide member 14 is placed in its posteriormost position as shown in FIGS. 1 and 2. When the slide member 14 is in such position, the member 90 will have pushed the member 83 rearwardly a sufficient distance so that the U-shaped portion of rod 84 extends through the hole 88, and blocks the channel 81. Thus, O-rings inserted into the magazine will fall by gravity until the lowermost contacts rod 84 assuming the position 101 (FIG. 3).

The operation of the machine involves three reciprocal movements of the slide member 14 to bring each ring from the magazine to the ultimate position on a workpiece. The progress of one ring through these three cycles will be followed. It will be understood, however, that, in normal oeration, all three cycles are occurring simultaneously with respect to different rings, and that there are several rings in different stages of progress through the apparatus.

Figure 4:
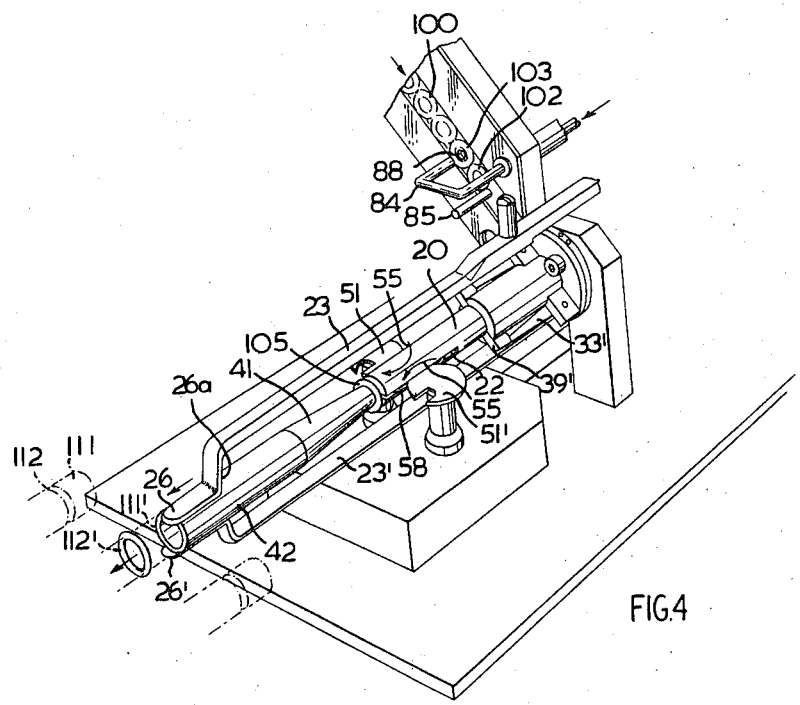

To commence the first cycle, the slide member 14 and associated members are advanced forwardly to the limit of their travel. This results in the rods 84 and 85 also moving forwardly, as the member 83 is pushed by the push member 91. The rod 84 is thus removed from its blocking position in the channel 81, while the rod 85 enters a blocking position. This permits one O-ring, indicated as 102, to go past the level of the rod 84, and to rest against the rod 85, which blocks it. (FIG. 4). A second O-ring, indicated as 103, then takes up a position with its central hole opposite the rod 84.

It will be understood by one skilled in the art that the spacing of rods 84 and 85 from one another will be determined by the size of the O-rings being used, so that the configuration described can be attained.

The member 14 is then moved to its most posterior position, completing the first cycle. As this is done, push member 90 contacts member 83, moving it rearwardly. Member 83 moves rod 84 into a position blocking channel 81. Member 83 also moves rod 85 out of a position blocking channel 81, permitting the O-ring 102 to drop into the cavity 32 (FIG. 2), to assume position 104. The next O-ring above it, numbered as 103, is retained from falling by the rod 84. (FIG. 3)

It will thus be seen that a single O-ring has been supplied to the chamber 32. In similar fashion, another single O-ring will be applied to chamber 32 with each forward and backward reciprocal movement of the slide member 14.

The progress of the O-ring 104 which has reached the chamber 32 will now be followed. This O-ring is oriented because of the shape of the chamber in a direction approximately at right angles to the posterior end of the rod 40. The slide member 14 is advanced forwardly to the limit of its travel a second time, to commence the second cycle. The slide member pushes push rod 20, the end 20 of which engages the periphery of the O-ring, and urges it over the posterior end of the rod 40. The posterior end of the rod 40 is smaller than the hole in the O-ring, so that the O-ring slides over such posterior end without difficulty. The member 20 continues to advance with the member 14, and pushes the O-ring forwardly along the rod 40. As it does so, the posterior portion of the rod 40 is received in the hollow portion 21 of the member 20. As the member 14 continues its forward cycle, taking the member 20 and the O-ring along with it, either the O-ring or the member 20 (depending on the configuration) engages the cam faces 34a and 34'a on members 33 and 33' respectively. This causes the jaws 34 of the two members to spread apart, as each member 33 pivots about its respective pivot point 36. The jaws urged by the spring means associated with pivots 36, close tightly about the member 20 as it passes through them after pushing the ring forward.

In this advance of the slide member 14, the ring is pushed forward to a position as shown in FIG. 4. The ring is identified in FIG. 4 as ring 105.

After its travel forward past the jaw 34, the ring must pass by the rod support member 50. The ring is positively pushed by the rod 20, and is spread slightly by the members 57 and 57', as it passes over them.

At the same same time as the ring is spread, member 67 engages rack 61 and causes it to move forwardly. As the rack moves forwardly, it turns pinion 59' and the corresponding pinion 59 (not shown), cuasing columns 53 and 53' and their associated discs 51 and 51' to rotate. The direction of such rotation is as shown by the arrows 55 and 55' in FIG. 4. The O-ring 105, having been slightly spread by the wings 57 and 57', has its two sides received in the recesses 54 and 54' of the two discs. The discs continue to rotate as rack 61 advances, and the ring continues to be pushed forward by the rod 20. As the ring passes the discs 51 and 51', the portion which would otherwise contact the peripheries of the discs are contained in the recesses 54 and 54'. Thus, the O-ring is not marred or cut by the periphery of discs 51 and 51', but the discs (except the small portions represented by the recesses 54 and 54') continue to engage the slits 52 and 52' in the rod 40, providing continuing support for that rod.

Wings 58 and 58' are provided to receive the O-ring as it passes in slightly expanded form out of recesses 54 and 54'. These wings provide camming surfaces which reduce the O-ring to unexpanded form in the gradual way as it continues to advance under positive pushing from push member 20. The camming surfaces are sufficiently abrupt to make it difficult for an O-ring to expand along them in the reverse direction, for a purpose to be shown later.

As the member 20 continues forwardly during the forward stroke of the slide rod 14, the slots 22 in its sides pass around the discs 51 and 51' so that these discs can continue to support the rod 40.

At the end of the second forward stroke of the member 14, the O-ring whose progress we are following is now in the position shown as 105. The member 14 is now retracted to its posterior position to complete the second cycle. The retraction of the member 14 to its posterior position does not affect the position of this O-ring, although it causes the member 20 to return to its initial position as shown in FIGS. 1, 2 and 3, and supplies another O-ring to chamber 32 as described with reference to the previous cycle. The retraction of member 14 also disengages the push member 68 from the rack 61, and the spring 69 then takes effect to return the rack 61 to its posterior position. This in turn causes rotation of the discs 51 and 51' in the direction shown by arrows 55A and 55'A in FIG. 3, thus putting these discs in position for reception of another O-ring, when such O-ring is pushed in the next cycle from the chamber 32 by the push rod 20.

At the beginning of the third cycle of advancement of the slide member 14, there is a ring resting in the position 105, and a second ring resting in the position 104 in the chamber 32. The ring in position 105 will be followed. As the member 14 advances, the associated arm 23 and 23' advance along with it. The fingers 26 and 26' on these arms engage the O-ring in position 105, and slide it forwardly along the guide rod 40.

The fingers 26 and 26' push the O-ring up the inclined section 41 of the guide rod 40, expanding the O-ring as they do so. The O-ring is then slid by the pushing of the fingers along the larger diameter portion 42 of the member 40.

The fingers are able to follow the sloping contours of the section 41 because the arms 23 and 23' which bear them are pivoted at 24 and 24' to the push member 14. The springs 25 and 25' ensure that the fingers follow tightly against the slope 41 of the member 40.

At the expanded end 43 of the member 40 are the workpieces to which O-rings are to be applied. These are illustrated as cylinders 111, each of which has a recess 112 for the insertion of an O-ring. The cross-sectional shape of the portion 42 of the member 40 is designed to be the same as that of the workpieces 111 with which the machine is to be used. The workpieces are advanced by a suitable conveying mechanism (not shown) so that they stop singly in register with the end 43 of the slide member 40, and substantially in contact therewith, as shown in FIGS. 1 and 4. The conveyor system is arranged so that it does not advance when the slide member 14 is moving forward, but it advances a fresh workpiece 111 into register with the end 43 each time the slide member 14 moves backwards.

During the forward motion of the third cycle, the fingers 26 and 26' push the O-ring in position 105 up the tapering portion 41 of the member 40, thus expanding that O-ring to the configuration of the portion 42 of the member 40, which configuration is the same as that of the workpieces with which the machine is used. As shown in FIG. 4, the fingers 26 and 26' extend beyond the end of the member 40, thus pushing the O-ring off the end of the member 40, and onto the workpiece (indicated as 111'), which is in register at that particular time with the end of the member 40. The O-ring is pushed by the fingers 26 and 26' until such time as it encounters the groove in the workpiece (here indicated as 112'). When the ring encounters the groove, it snaps into the groove, because of its inherent tendency to contract from its expanded state. Suitably, the members 23 and 23' are long enough so that the fingers 26 and 26' push the O-ring as far as the groove when the member 14 has reached the limit of its forward travel. However, if the members 23 and 23' are longer than this, the device will still be operative if the groove is deep enough so that the O-ring will snap into the groove and the fingers 26 and 26' will pass over it.

It will be understood that the particular form of workpiece is no part of this invention, and it may be desired in some cases to apply O-rings to workpieces which have no groove whatsoever. In this case, the length of the arms 23 and 23' should be made sufficient so that the fingers 26 and 26' will push the O-ring the desired distance onto the workpiece While the forward motion of the slide rod 14 is causing the fingers 26 and 26' to push the particular O-ring which we are following onto the workpiece, it will be understood that this same motion is supplying another O-ring to the position 105, as previously described with respect to the second cycle, and a third O-ring to the position 102, as previously described with respect to the first cycle.

As the slide member 14 withdraws from the third cycle, it leaves the O-ring we have been following on he workpiece in position 106. Simultaneously, the conveyor is advanced, so that the workpiece 111' having the ring 106 on it is no longer aligned with the member 40, and a new workpiece becomes aligned with the member 40, ready for the repetition of the cycle. Also, during the movement of the slide member 14 backwards a further O-ring is supplied to position 104 in chamber 32. The push fingers 26 and 26' being mounted on arms 23 and 23' which are pivotable about pivot pins 24 and 24' respectively, can slide over the O-ring in position 105 without moving it backward as they are moved rearwardly by the rearward stroke of member 14. This is helped by a tapered shape to the back of the push fingers, as shown at 26a in FIGS. 3 and 4, which permits these fingers to rise gradually as they engage the O-ring in position 105. Backward motion is also prevented by the wings 58 and 58', which have abrupt camming surfaces up which the ring cannot pass easily in the rearward direction.

It will thus be appreciated that, during normal operation of the machine, when the slide member 14 is at the rearmost position of its cycle, there are rings in the positions 103, 104 and 105. When the slide member 14 is at the most forward point of its cycle, there are rings in the positions 102, 103, 105 and 106. Theses two positions are shown respectively in FIGS. 3 and 4.

Although the present invention has been described in relation to a machine for expanding O-rings, it will be readily apparent that the same machine could be used for other endless sealing members, with modifications to the cross-section of member 40 and to the supply apparatus 80, as would be obvious to one skilled in the art. Similarly, it will be obvious that the mechanism for supporting the guide rod 40 and for pushing sealing members along it will be applicable to any conveyor system in which endless members are pushed along a guide rod. The support of member 40 is carried out by push member 20, jaws 34 and 34', and discs 51 and 51'. These means of supporting the push rod can be used whether or not the members being pushed along the guide 40 are flexible, although in the case of non-flexible members, the wings 57, 57', 58 and 58' should be omitted, and it may be desirable to enlarge the recesses 54 and 54'. In a conveyor application, the expander section 41 and 42 on the member 40 is of course not necessary, and should of course not be present if the members being conveyed are not flexible.

It is understood that the present disclosure merely describes the preferred embodiment of the invention as presently contemplated by the invention. It is not intended to be constructed as limiting the invention, which is not to be limited except as described in the appended claims.

The embodiments of the invention in which an exclusive property or privilege is claimed are defined as follows:

1. Apparatus for expanding deformable rings for application to a workpiece, which comprises:

a guide member having a first end and a second end;

said guide member having a first portion adjacent said first end with a cross-section smaller than that of the rings with which the apparatus is useable, whereby said rings can slide freely along said first portion, a second portion adjacent said second end having a cross-section corresponding to the desired expanded shape of said rings, and an intermediate portion forming a smooth transition from the cross-section of the first portion to the cross-section of second portion;

means for threading rings onto said first end of said guide member, advancing such rings along said guide member from said first end to said second end, whereby such rings become expanded to the desired cross-section, and pushing said rings off said second end of said guide member.

2. Apparatus as claimed in claim 1, in which said means for threading rings onto said first end of said guide member comprises:

supply means for supplying a ring to a position adjacent said first end and transverse thereto such that the central hole of such ring is immediately adjacent said first end, and a push rod operable to push at least part of the periphery of such ring, whereby to slide such ring over said first end and along said guide rod.

3. Apparatus as claimed in claim 1, in which said means for advancing said rings along said guide member comprises two spaced push rods operable to engage portions of said ring on opposite sides of said guide rod, and to push said ring towards said second end, the two push rods being arranged to push simultaneously and at the same speed.

4. Apparatus as claimed in claim 1, additionally comprising a support member for said guide rod said support member being normally urged against said guide rod, but being moveable out of engagement with said guide rod to permit passage of a ring.

5. Apparatus as claimed in claim 4, in which said means for advancing said rings along said guide rod is a push member operable to push a said ring, said push member is operable to move said support member out of engagement with said guide rod, prior to the ring being pushed by said push member reaching said support member and said push member acts as a support for said guide rod while said support member is out of engagement with said guide rod.

6. Apparatus as claimed in any of claims 1, comprising a rotatable member having a periphery bearing against said guide rod normally to support said guide rod, a recess in the periphery, and means for rotating said rotatable member as a ring is advanced along said guide rod such that the portion of the ring which would otherwise pass between the guide rod and the periphery is instead received in the recess, which recess advances with it such that the said portion remains in the recess until the ring has passed the rotatable member.

7. A conveyor system for endless members, comprising:
a guide rod which said endless members are adapted to surround, and along which said endless members are adapted to travel;
means for moving said endless members along said guide rod; and;
support means for said guide rod, said support means being moveable to permit passage of said endless members along said guide rod.

8. A conveyor system as claimed in claim 7, in which a said support means comprises at least two opposed jaws positioned to hold the guide rod, said jaws being operable to spread away from said guide rod to permit passage of an endless member along said guide rod and to close again whereby to hold said guide rod after passage of said endless member.

9. A conveyer system as claimed in claim 8 in which said means for moving said endless member along the guide rod comprises a push rod operable to push an endless member, and said push rod is provided with an extension operable to engage said jaws before an endless member pushed by said push member reaches said jaws, said extension being operative to cause said jaws to spread whereby to permit passage of said endless member.

10. A conveyor system as claimed in claim 7, in which a said support means comprises a rotatable member having its periphery bearing upon the guide rod so as to support said guide rod, a recess in the periphery of said rotatable member; means for rotating said rotatable member so that the portion of an endless member advancing along the guide rod, which would otherwise be squeezed between said periphery and said guide rod, is instead received in said recess, which advances with it such that the said portion remains in the recess until the endless member has passed the rotatable member.

11. Apparatus as claimed in claim 10, in which said rotatable member is a wheel rotating about an axis perpendicular to the axis of the guide rod at the point of contact of the wheel and the guide rod.

* * * * *